No. 652,545. Patented June 26, 1900.
J. A. MITCHELL & W. C. RAND.
TELLURIAN.
(Application filed Dec. 26, 1899.)
(No Model.) 3 Sheets—Sheet 1.
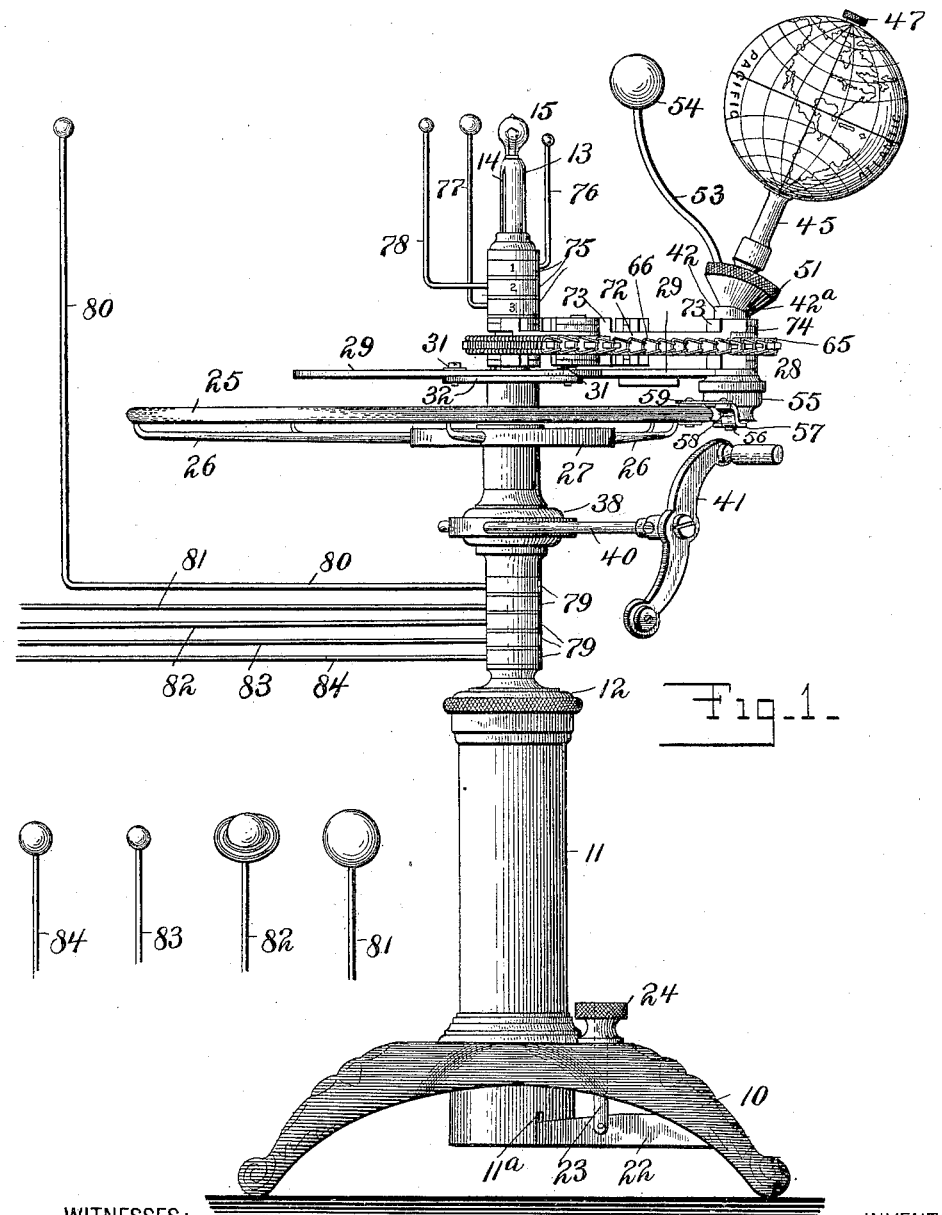
WITNESSES:
F. N. Roehrich
Ethel M. Wallder
INVENTORS
Josephine A. Mitchell,
William C. Rand,
BY
W. B. Hutchinson,
ATTORNEY.

No. 652,545. Patented June 26, 1900.
J. A. MITCHELL & W. C. RAND.
TELLURIAN.
(Application filed Dec. 26, 1899.)
(No Model.) 3 Sheets—Sheet 2.
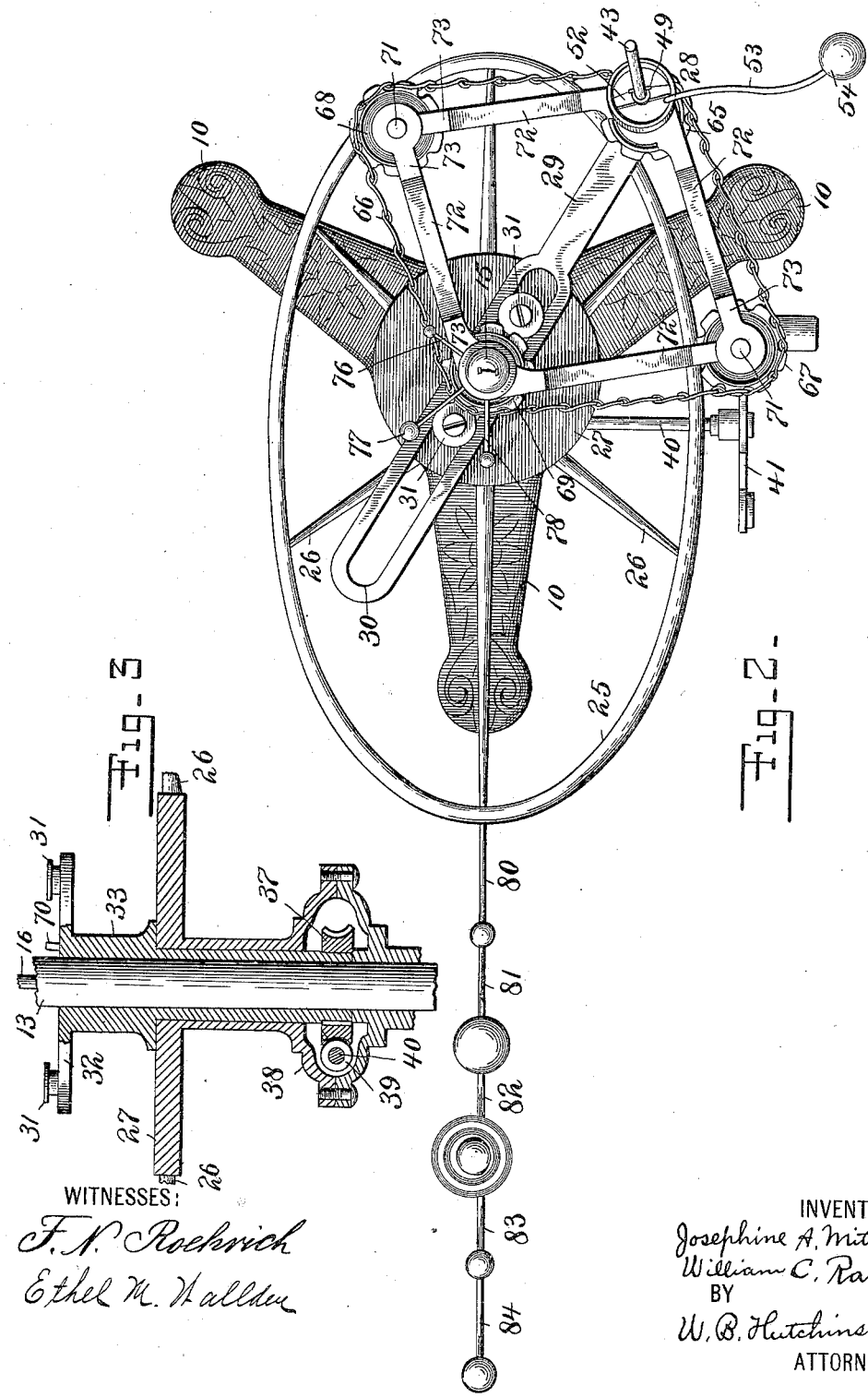

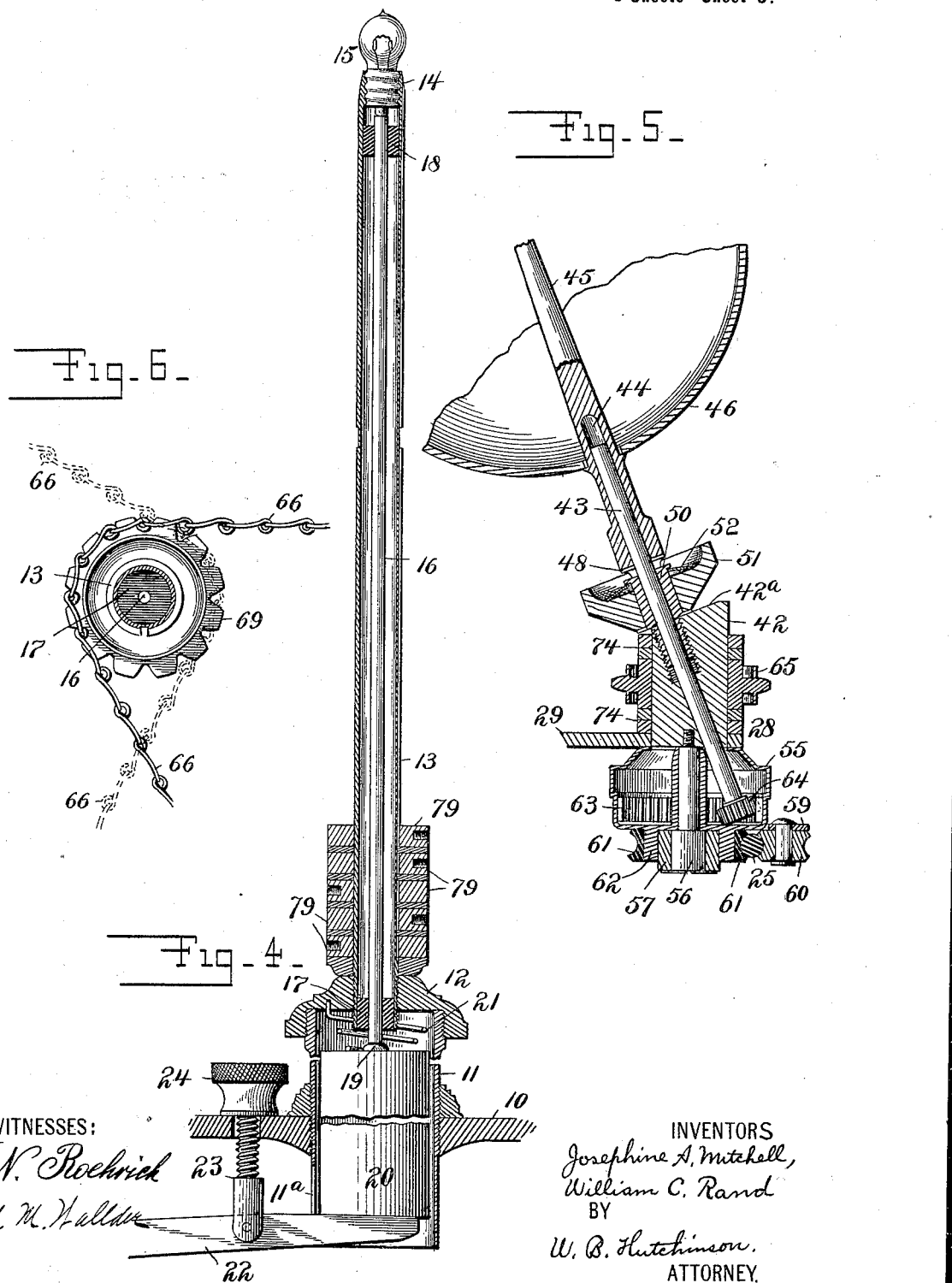

UNITED STATES PATENT OFFICE.

JOSEPHINE A. MITCHELL AND WILLIAM C. RAND, OF LEWISTON, MAINE; SAID RAND ASSIGNOR TO SAID MITCHELL.

TELLURIAN.

SPECIFICATION forming part of Letters Patent No. 652,545, dated June 26, 1900.

Application filed December 26, 1899. Serial No. 741,694. (No model.)

*To all whom it may concern:*

Be it known that we, JOSEPHINE A. MITCHELL and WILLIAM C. RAND, of Lewiston, in the county of Androscoggin and State of Maine, have invented certain new and useful Improvements in Tellurians, of which the following is a full, clear, and exact description.

Our invention relates to improvements in tellurians; and one object of our invention is to produce a very simple, practical, and attractive device which is particularly adapted for use in school-rooms and is intended to give to the pupils a very good physical illustration of the diurnal and annual movements of the earth in relation to the sun, which is also intended to illustrate the elliptical orbit of the earth around the sun, the inclination of the earth's axis to the ecliptic, the maintenance of such inclination through the several seasons, the phenomenon of night and day, the phenomena of eclipses, change of seasons, &c., peculiar to the earth and other planets, the relation of the earth to various other planets, and in general to produce a device which will mechanically illustrate the various movements of the earth with especial reference to the sun in such a way as to impress the mind of the student and fix in his mind the aforesaid movements and phenomena.

Another object of our invention is to produce an invention of this character which is compact and durable, easily manipulated, and which has a particularly nice and luminous representation of the sun, forming the center of the planetary system.

To these ends our invention consists of a tellurian the construction, arrangement, and organization of which will be hereinafter described and claimed.

Reference is to be had to the accompanying drawings, forming part of this specification, in which similar figures of reference refer to similar parts throughout the several views.

Figure 1 is a side elevation of our improved apparatus, parts of the planet-supporting rods being broken. Fig. 2 is a plan view of the apparatus. Fig. 3 is a detail vertical section showing the gear mechanism for revolving the earth-carrying carriage. Fig. 4 is a detail vertical section of the central column and spindle and the battery connections for lighting the electric lamp. Fig. 5 is a detail vertical section of the gear mechanism for imparting the rotary axial movement to the earth, and Fig. 6 is a detail horizontal section showing the arrangement of the fixed sprocket-wheel and illustrating diagrammatically the action of the chain belt thereon.

Our invention contemplates a central representation, preferably luminous, of the sun, an elliptical smooth track extending around the sun, a globe sustained at the proper inclination on the said track, mechanism for moving the globe around the track, mechanism for maintaining its axial inclination to the said elliptical track, and mechanism for rotating the earth on its own axis.

Obviously the above mechanism can be carried on various supports; but the means illustrated is preferably employed. As shown, the apparatus is provided with a base 10, adapted to rest firmly on a support, from which base rises a central hollow column 11, preferably closed at the top by a screw-cap 12, and rising from this cap is a central stem or spindle 13, which is also hollow and which is preferably screwed to the cap. This stem or spindle 13 terminates at the top in a socket 14, in which can be screwed the base of the incandescent lamp 15, which is a lamp of standard make, but is very small, so as not to require too much battery-power. Contact is made between the bulb of the lamp and the conductor 16, which is held in suitable insulations 17 and 18 within the stem or spindle, and at the lower end the conductor touches one pole 19 of a standard battery 20, which fits snugly in the hollow column 11 and is normally pressed downward in the said column by a spring 21, (see Fig. 4,) so as to bring the bottom, forming the second pole of the battery, into contact with the conducting-lever 22, which is pivoted on the frame or base 10 and serves to support the battery 20, as well as act as a connection with the pole of the battery. The battery is not illustrated in detail, because it is a standard make which can be purchased in the open market. Pivoted to the lever 22 is a screw 23, which extends upward through a hole in the base 10 (see Fig. 4) and enters thumb-nut 24. It will be seen, then, that by manipulating the nut 24 the lever 22 and battery 20 can be raised, so as to bring the pole-piece 19 into contact with the conductor 16 and so close the circuit through the lamp, or the lever and battery can be dropped, so as to break connection between the pole-piece 19 and conductor 16 and so open the circuit. It will be noticed that for convenience the column is slotted at 11ª to provide for the movement of the lever 22, and this arrangement entirely conceals the inner end of the lever and the battery.

By unscrewing the nut 24, so as to free it from the screw 23, the lever 22 may be tipped back by tilting the base 10 and the battery removed and a new one inserted.

The circuit through the lamp when closed is rather peculiar. It is from the pole-piece 19, through the conductor 16, the lamp 15, out through the base 14, the spindle 13, the metal of the frame, the screw 23, and the lever 22 back to the battery. The local connections in the lamp are not shown, because these are, as above stated, of standard make.

The track 25, on which the globe is supported and moved, is elliptical in shape and is perfectly smooth, it being sustained on the ends of the spokes 26, which are curved upward at the outer ends, as shown in Fig. 1, so as not to interfere with the carriage or any part thereof, and these spokes extend to the hub 27, which is held stationary on the spindle 13 in a manner more particularly described below.

The representation of the earth and the mechanism for rotating it are carried on a carriage 28, which travels on the elliptical track 25, this carriage being supported at the outer end of an arm 29, which extends inward, as best shown in Fig. 2, and is longitudinally slotted, as shown at 30, this slot receiving the rollers 31, which act merely as guides and for which other suitable guides can be substituted. The rollers or guides are supported on an arm or plate 32, which is secured to an elongated hub 33, the latter being rotatable on the spindle 13, and the said hub is provided with a worm-wheel 37, which is held in a case 38, this for convenience being made in two parts, the upper of which is made integral with the hub 27 of the track which it supports; but it will of course be understood that the parts just referred to and other parts shown integral can, if preferred, be made in several pieces. The worm-wheel 37 just above referred to engages with and is driven by a worm 39 on a transverse shaft 40, which is journaled in the case 38 and extends outward to a point where it can be conveniently reached, where it is secured to a crank-handle 41, this handle being extended in two directions from the shaft, so that it can be conveniently grasped at either end and operated slowly by the teacher or other manipulator of the apparatus. It will be observed that by turning the crank and shaft the gears 39 and 37 are driven and the hub 33 and plate 32 revolved, which action is imparted to the arm 29 and by the arm to the carriage 28, to which the arm is pivotally attached, so that by the rotary movement of the plate 32 the carriage 28 is moved along the track 25, on which it is guided, as presently described.

The carriage has as a part of it an essentially-cylindrical block 42, which is inclined or beveled off at the top, as shown at 42ª, to provide a convenient connection for an abutting part, to be hereinafter referred to, and in the block is mounted an inclined shaft 43, which is held at an inclination to the elliptical plane of the track 25 and which at its upper or free end is adapted to enter the socket 44 in the spindle 45, which spindle supports the globe 46, representing the earth, and is of usual construction, the globe being held to the spindle in the ordinary way—to wit, by the nut 47. The spindle 45 is slotted transversely at its lower end, as shown at 48 in Fig. 5, to receive the transverse pin 49 on the shaft 43, so that when the shaft is rotated the spindle and globe are also similarly rotated.

Just beneath the spindle 43 is a journal-bearing 50, which is screwed into the block 42, and on this is journaled a disk 51, which is preferably dishing on top and which at the bottom abuts with inclined face 42ª of the block 42. In the dishing upper part of the disk 51 is held a spring 52, which is convex, as shown at 55, and which is made to bear at its ends against the flange of the disk 51 and at the center against the block 50, so that it serves as a brake, which while permitting the disk 51 to be turned yet has sufficient friction to prevent it from turning accidentally. This disk 51 supports a curved arm 53, on which is a ball 54, which should be gilded and which represents the moon, holding it in its approximately-correct position as a satellite of the earth.

The lower end of the shaft 43 extends into a casing 55, which is held beneath the block 42 and is journaled on a stud 56, which is screwed into the lower end of the block 42 (see Fig. 5) and which also is secured to the brace 57, which extends beneath the casing 55 and has its upturned ends 58 (see Fig. 1) secured to a horizontal yoke 59, which extends to a point inside the track 25 (see Fig. 5) and supports the grooved guide-roller 60, which is journaled on the yoke 59 and fits the inner side of the track 25, while the outer side of the said track is held in close engagement with the friction-wheel 61, which wheel can be made of rubber or any material capable of getting a good grip on the smooth track. The friction-wheel 61 is fast to a hub 62 at the bottom of the casing 55, and it will be seen that when the carriage 28 is moved bodily along the track 25 the friction-wheel 61 and casing 55 will be by this action revolved. The casing 55 has within it a gear 63, which meshes with a pinion 64 at the lower end of the shaft 43, and the pinion has a sliding connection with the gear, so that as the block 42 is turned and the position of the shaft 43 changed slightly the pinion 64 will nevertheless continue to mesh with this gear, and it will be observed that the turning of the gear will impart a rotary movement to the pinion 64, shaft 43, and the globe 46 carried thereby. The gearing just described is timed so that the earth will make a revolution in the proportionately-correct time as it proceeds on its orbit around the sun, which is represented by the central lamp heretofore described. The block 42 is adapted to turn on its longitudinal axis, so that by so doing the shaft 43, representing the earth's axis, will always be inclined toward the north at the approximately-correct angle without reference to the particular position of the earth on its orbit, so that as the earth-globe moves around on the track representing its orbit its proper inclination will thus always be maintained. To provide for this rotation of the block 42, it has a sprocket-wheel 65, which is engaged and driven by a chain belt 66, which also engages the sprocket-wheels 67, 68, and 69, the two former being held by opposite sides of the extensible frame, to be referred to presently, and the sprocket-wheel 69 being fixed. The sprocket-wheel 69 is keyed to the spindle 13. The extensible frame just referred to comprises the four arms or rods 72, (see Fig. 2,) which are forked at the ends, as shown at 73, so as to straddle the several sprocket-wheels just referred to, and the arms, which are journaled, are formed into abutting rings in the common and well-known way, the parts being reduced to take up little room. The frame formed by the arms or rods is at one end journaled to the spindle 13, at the other to the block 42, and at the two remaining ends the frame is journaled on the studs 71, which form the journals of the sprocket-wheels 67 and 68. The inner end of the frame is for convenience held on the abutment 70. (Shown in Fig. 3.)

It will be observed that the sprocket-wheel 69 being fixed merely acts as a fulcrum or bite for the chain belt 66, and as the carriage 28 is moved around the elliptical track 25 its position with reference to the spindle 13 changes and its distance from the spindle also changes; but the extensible frame just described above elongates and contracts to meet the requirements; but at all times the chain belt 66 is held taut and will slowly turn the sprocket-wheels 65, 67, and 68, the two latter being intermediate wheels, but the first mentioned serving to slowly turn the block 42, and thus correctly change the inclination of the shaft 43 with reference to the track 25.

Journaled on the spindle 13, near the top, is a series of rings 75, which serve as supports for the elbow-rods 76, 77, and 78, which are used in illustrating the solar system and support, respectively, balls representing Mercury, Venus, and the earth. It will of course be understood that a greater or less number of rings can be used and that they may be dispensed with even without particularly affecting the character of the invention. The elbow-rods can be screwed into or out of the rings, so that they need not be used unless it is desirable, and this also renders the instrument easy to arrange for packing. The same may be said of the fact that the globe 46 is removable and that the other elbow-rods (to be presently referred to) are removable. A second series of rings 79 is arranged lower down on the spindle 13, (see Fig. 4,) and these are intended to carry the elbow-rods 80, 81, 82, 83, and 84, which are screwed to the rings and which carry balls representing, respectively, Mars, Jupiter, Saturn, Uranus, and Neptune. It is of course evident that a greater or less number of these rings, rods, and planet-representing devices can be used without in any way affecting the nature of the invention. It will be observed that the rings 75 and 79 can be turned on the spindle 13, so that the planets may be brought into the desired position in relation to the earth and sun and in relation to each other, so as to exemplify in a certain degree the teachings of astronomy as generally set forth.

The machine being set up as described and the electric lamp lighted by means of the button 24, or, if the button is screwed up, by means of screwing or unscrewing the lamp itself, the operator turns the crank 41, which by means of the mechanism described starts the carriage on its movement around the track 25, thus representing the annual movement of the earth around the sun. As the carriage moves the gears 63 and 64 will in the manner described turn the earth-globe on its axis, and meanwhile the sprocket and chain-belt mechanism will slowly turn the block 42, so that as the earth travels in its orbit the shaft 43 will be moved gradually and held at the proper inclination.

It will be understood from the foregoing description that very much of the mechanism employed can be changed without affecting the principle of the invention, that instead of the lamp 15 a gilded or other representation of the sun can be used, and that the general structure and appearance of the instrument may be departed from without affecting the principle of the invention, although the mechanism shown in detail is claimed as novel.

Without going into too much detail, it will be readily seen that the greater part of the matter generally taught in elementary schools with reference to the earth's movements and phenomena of our planetary system can be exemplified by this apparatus. For instance, the lamp representing the sun it will be clear to the pupil as the earth revolves how it is that night succeeds the day, and how that the sun appears to rise in the east and set in the west. The moon can be arranged so as to show how an eclipse is produced. The shape of the earth can be illustrated, and the manner in which it is supposed to be flattened at the poles. The several motions of the earth will of course be apparent. It will appear clearly how much of the earth's surface can receive light and heat from the sun at one time and why the poles do not receive light and heat at all times. The yearly motion of the earth, its direction, velocity, continuity, its orbit, the shape of the earth, when the earth is nearest the sun, when farthest from it, and the causes of seasons can all be clearly set forth. The maintenance of the earth's axial inclination to the north throughout the several seasons, the change in the length of the days, the relative positions of the sun, earth, moon, and other planets, the direction of moon and apparent motion of the moon, the phases of the moon, and tides and their causes can all be made especially clear. The solar system can be very nicely illustrated, and without enumerating any further detail it will be seen from a little study that almost everything pertaining to the planetary system can be made very clear by the aid of the apparatus herein described.

We have shown and described a smooth track having depressed spokes, which structure is preferable; but it will of course be understood that the track may be notched, if preferred, and other gearing used to turn the globe and to maintain its inclination without departing from the purpose of the invention.

Having thus described our invention, we claim as new and desire to secure by Letters Patent—

1. An apparatus of the kind described comprising a supporting-column having a representation of the sun at the top, an endless track supported by and encircling the column, a carriage movable on the track and carrying a globe-supporting shaft, a means for turning the said globe-shaft by the movement of the carriage on the track, a gear-turned hub journaled on the column, a plate fast to the hub and provided with guides and a longitudinally-movable slotted bar engaging the guides and the plate and connected to the carriage, substantially as described.

2. The combination with the endless track, the carriage movable on the track, the column supporting the track, and the rotatable carriage-block adapted to carry a shaft to support a globe, of an extensible frame connecting the carriage and column, said frame expanding laterally when contracted longitudinally, and means as the fixed sprocket-wheels on the column and carriage-block, the loose sprocket-wheels at the opposite sides of the frame and the engaging belt for turning the carriage-block by the advance of the carriage, substantially as described.

3. An apparatus of the kind described, comprising an endless track, a support extending upward through the track, a carriage movable along the track, a rotatable block journaled on the carriage, a globe-supporting shaft journaled in the block at an inclination to the plane of the track, means for turning the shaft by the movement of the carriage, an extensible frame and guide connecting the carriage with the central support, and means as the sprocket-wheels and belt for turning the carriage-block by the movement of the carriage, substantially as described.

4. The combination with hollow support and the globe-carrying mechanism above the support of the battery contained within the support, a lamp at the top of the support, suitable connections between the battery and lamp and an adjustable lever for raising and lowering the battery and so making and breaking the lamp-circuit, substantially as described.

5. The combination with the support and the globe-carrying mechanism movable around the support of the lamp on the support, the battery movable up and down within the support, and means for raising and lowering the battery and so making and breaking the circuit through the lamp, substantially as described.

JOSEPHINE A. MITCHELL.
WILLIAM C. RAND.

Witnesses:
HENRY P. DORMAN,
AURELIA SPRINGER.